United States Patent
Sears et al.

(10) Patent No.: US 8,595,137 B2
(45) Date of Patent: Nov. 26, 2013

(54) BANKCARD CASH DISBURSEMENTS AT CASINOS

(76) Inventors: Thomas M. Sears, Henderson, NV (US); Kirk E. Sanford, Las Vegas, NV (US)

(*) Notice: Subject to any disclaimer, the term of this patent is extended or adjusted under 35 U.S.C. 154(b) by 280 days.

(21) Appl. No.: 12/925,363

(22) Filed: Oct. 20, 2010

(65) Prior Publication Data

US 2011/0231314 A1 Sep. 22, 2011

Related U.S. Application Data

(60) Provisional application No. 61/340,424, filed on Mar. 17, 2010.

(51) Int. Cl.
*G06Q 40/00* (2012.01)
*G06Q 20/18* (2012.01)

(52) U.S. Cl.
CPC ...................................... *G06Q 20/18* (2013.01)
USPC ............... 705/43; 235/380; 235/379; 705/44; 705/39; 705/42; 705/16; 463/25; 463/42; 463/29; 463/16

(58) Field of Classification Search
USPC ............ 705/43, 44, 39, 42, 16; 235/380, 379; 463/25, 42, 29, 16
See application file for complete search history.

(56) References Cited

U.S. PATENT DOCUMENTS

| | | | |
|---|---|---|---|
| 7,025,216 B2* | 4/2006 | Kaczmarek | 211/133.6 |
| 7,033,276 B2* | 4/2006 | Walker et al. | 463/40 |
| 7,175,076 B1* | 2/2007 | Block et al. | 235/379 |
| 7,680,710 B2* | 3/2010 | McCallum | 705/35 |
| 7,704,145 B2* | 4/2010 | Glisson et al. | 463/25 |
| 7,950,996 B2* | 5/2011 | Nguyen et al. | 463/25 |
| 8,088,001 B2* | 1/2012 | Preisach | 463/25 |
| 8,187,086 B2* | 5/2012 | Young | 463/25 |
| 2002/0132664 A1* | 9/2002 | Miller et al. | 463/29 |
| 2003/0004871 A1* | 1/2003 | Rowe | 705/39 |
| 2004/0139014 A1* | 7/2004 | Song et al. | 705/40 |
| 2005/0080738 A1* | 4/2005 | Sellen et al. | 705/42 |
| 2005/0080792 A1* | 4/2005 | Ghatare | 707/100 |
| 2007/0087832 A1* | 4/2007 | Abbott et al. | 463/42 |
| 2007/0167212 A1* | 7/2007 | Nguyen | 463/16 |
| 2007/0225068 A1* | 9/2007 | Weiss | 463/25 |
| 2008/0097907 A1* | 4/2008 | Till et al. | 705/45 |
| 2009/0012897 A1* | 1/2009 | Flitcroft et al. | 705/43 |
| 2009/0029763 A1* | 1/2009 | Schwartz | 463/25 |
| 2009/0065573 A1* | 3/2009 | Potts et al. | 235/379 |
| 2009/0132415 A1* | 5/2009 | Davis et al. | 705/43 |

OTHER PUBLICATIONS

"Mobile Payment Method and System", Simoes Luis, WO 2008/015637 A2, Aug. 2, 2006.*

* cited by examiner

*Primary Examiner* — Tien Nguyen
(74) *Attorney, Agent, or Firm* — Sue Z. Shaper

(57) ABSTRACT

A method for processing cash advance transactions in a casino having an authorized MCD processor and, in particular, for processing non-service fee/surcharge transactions as Manual Cash Disbursements by the system.

10 Claims, 2 Drawing Sheets

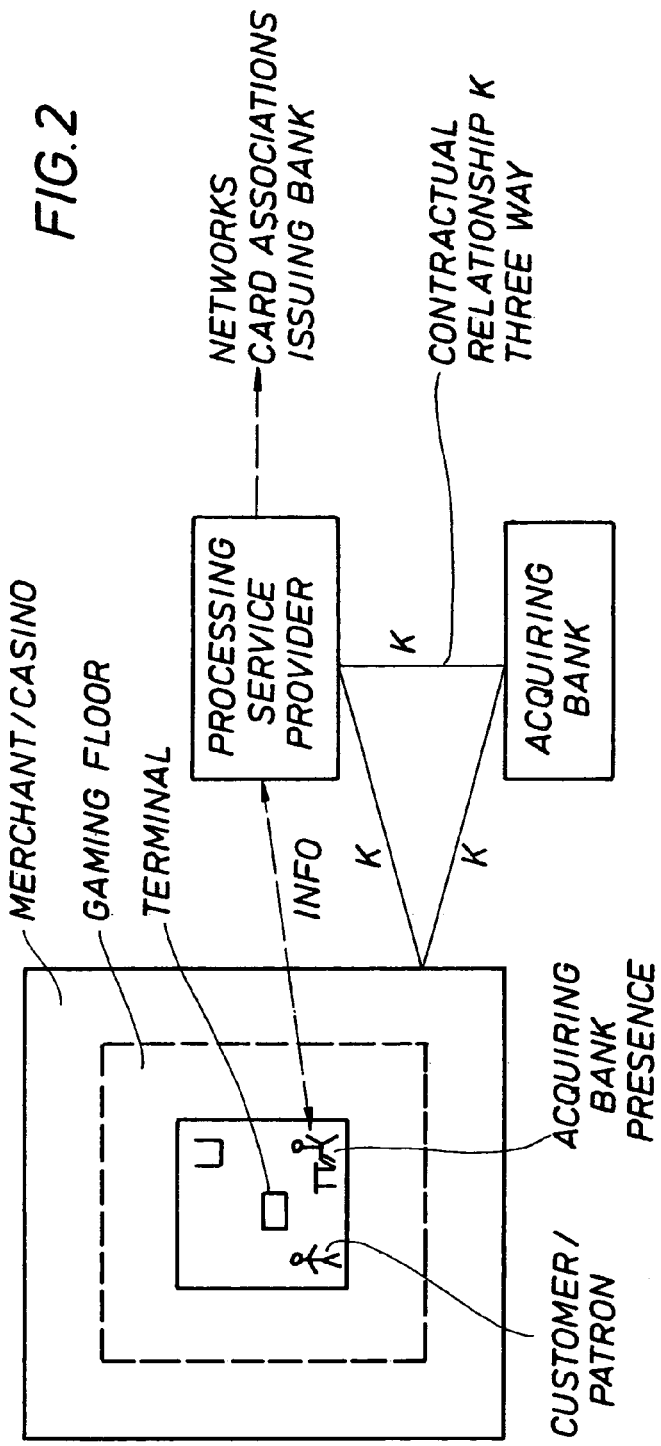

BANKCARD CASH DISBURSEMENTS AT CASINOS

CROSS REFERENCE TO RELATED APPLICATIONS

The instant application is related to and claims priority to co-pending provisional application 61/340,424, filed Mar. 17, 2010, entitled Manual Cash Disbursements at Merchants, inventor Thomas M. Sears. The above referenced co-pending application Ser. No. 61/340,424 is herein and hereby incorporated by reference in its entirety.

FIELD OF THE INVENTION

The invention relates to the field of financial transactions for customers at "casinos" and more particularly to the field of bankcard "cash advance" transactions at "casinos."

BACKGROUND OF THE INVENTION

"Casino" Context

Casino gaming is a highly popular activity in today's society. A particular individual's enjoyment of the casino gaming experience is often predicated on having an adequate supply of cash or other cash equivalents that allow the patron to participate in gaming activities such as slot machine and table game play. In the most basic form, the casino patron brings a specific amount of cash to the casino that can be exchanged for negotiable playing chips, casino issued gaming cards, or used with various gaming devices such as slot machines. Invariably, a casino patron may choose not to bring the desired amount of cash to the casino or the patron may deplete the supply of cash or cash equivalents brought to the casino before the casino patron is ready to end the gaming experience. Under these circumstances the patron will desire to obtain additional cash or cash equivalents through use of one or more financial instruments such as a debit card, credit card, or personal check where the casino patron maintains an account with all applicable financial institutions. For example, within the casino premises patrons generally have the ability to use an automated teller machine ("ATM"), cash a personal check, use a "debit card cash access" service, with or without a PIN, or a get a "cash advance" against their available credit card limit without a PIN.

The present invention addresses the use of a casino patron's Visa or MasterCard or like bankcard as a means to obtain cash, cash equivalent, or an item of value. Most casinos are equipped to accommodate "bankcard" transactions on the gaming floor or at the casino cage, which are commonly referred to as bankcard "quasi-cash," wire transfer money order (WTMO), or "cash advance" or "quasi cash" transactions pursuant to the Visa and MasterCard and the like rules. In this instance, the casino patron presents a financial institution issued bankcard, such as a Visa card or MasterCard card or the like card, to a casino cage cashier to complete required quasi-cash procedures pursuant to Visa or MasterCard or like Association rules and regulations. Upon completion of these required procedures and receipt of a valid authorization for the quasi-cash transaction, the casino cage cashier will provide either cash or gaming chips for the amount of the authorization, less any surcharge or convenience fee charged to the cardholder.

To obtain a valid authorization from the casino patron's financial institution bankcard, the following are required: an electronic processing device capable of reading an account number encoded on a magnetic stripe of a bankcard or chip card, or an alternate means by which the cardholder's account number can be manually entered into the system; the ability to enter the cardholder's requested amount to be authorized; and the capability to electronically transmit the authorization request through the various payment processors and bankcard networks. Examples of common types of electronic processing devices located on casino premises include ATMs, point of sale terminals, personal computers with payment software applications residing locally or on a remote server, and multifunction ticket redemption kiosks. The electronic processing devices are connected via the internet or other direct line or telecommunication infrastructure to a Visa or MasterCard or like Association approved transaction processing service provider. The processing service provider electronically transmits the required transaction information (including the bankcard account number, requested amount and any surcharge or convenience fees) to a bank Network. Upon delivery of this electronic message by the processor to the financial institution bankcard issuer, the financial institution bankcard issuer will either authorizes an approval or denies the transaction requested. If the authorization is approved, a casino employee or other person designated by the casino to perform quasi-cash transactions completes the required Visa or MasterCard or like Association procedures and provide the cardholder the cash or item of value such as a money order, casino-issued gaming chips, casino-issued stored value card, or a stored value card issued by a financial institution.

Most often a casino, or the casino's third party service provider or acquirer, will impose a surcharge or convenience fee on the cardholder when performing a quasi-cash transaction. This surcharge or convenience fee, associated with bankcard quasi-cash transactions, is generally the most expensive alternative for the casino patron in relation to other options a patron has to get cash or cash equivalents in a casino. In a casino environment a patron may pay 10 times the amount or more, in surcharge or convenience fees for a quasi-cash transaction, that they would otherwise pay for a standard ATM transaction processed at the same location. To illustrate, a quasi-cash transaction for a credit card without a PIN may cost a cardholder 3.5% to 10% of the requested amount in surcharge or convenience fees; (the higher the requested amount the lower the percent.) A quasi cash transaction based on a debit card with a PIN may cost the cardholder 3.5% to 6.5% of the requested amount; (again, the higher the requested amount, the lower the percent.) The same cash request at a standard ATM may only cost the cardholder on average $4.00 in surcharge or convenience fees, or about 1% of a $500 request.

The high surcharge or convenience fees associated with bankcard quasi-cash transactions are a deterrent to a large population of casino patrons from using their bankcard, with or without a PIN, as their available means of accessing cash.

Occasionally, a casino may elect to waive the surcharge or convenience fee to specific patrons that are considered valuable or "high roller" customers.

Regardless of whether or not a surcharge or convenience fee is assessed by a casino operator, however, the quasi-cash transaction is electronically submitted, processed, and authorized using the same quasi-cash processing indicators, which include, among other things, the same Merchant Category Code (MCC) that identifies the transaction as quasi-cash.

Studies in casinos have shown that when the service fees or surcharges are waived for cash advance transactions, patron spending increases significantly, such as by 50% or more among the class for which the fees are waived. Even among the class of all patrons, spending has been shown to increase by a significant percent when cash advance fees are waived for a least certain classes of patrons, such as well known patrons or for transactions of high dollar amount. The casino, thus, has an incentive to waive the surcharge or convenience fees. Nonetheless, the processing service provider must pay a 2.3% "interchange" fee to the issuing bank of the card and by the Card Association, and will thus charge the casino what is referred to as a "buyrate" fee, which is typically 2.5% to 3.5%. The casino historically covers the processing service provider "buyrate" fee (as well as a commission for itself) out of the customer "surcharge." If the casino waives the service fee or surcharge, the casino not only loses its commission but also loses money on every transaction of at least the "buyrate" charged by the processing service provider.

Thus, there is an incentive for a casino to waive patron service fees for quasi cash transactions, namely the documented "greater play" by patrons. There is also an incentive for the casino not to waive the fee, because the casino loses money on each quasi-cash transaction in that case. The casino has a tough decision. The instant invention offers a novel solution to the casino's tough decision, a clever way to improve the process.

The Fees Service Fees, Interchange, Buyrate

Visa and MasterCard and like Card Associations charge "interchange" fees to a casino, or to the service provider of a casino, for conducting quasi-cash transactions. (These fees, largely, are passed on to the card issuing bank.) Interchange fees for quasi-cash transactions are typically based on a percentage of the authorized requested amount and can vary depending on transaction qualifications criteria (i.e. swiped card capture vs. key entered card number) and whether or not the card is branded Visa or MasterCard or the like.

A patron request for a cash advance typically has an additional surcharge or convenience fee attached to it by the casino or service provider. The "authorization request" will be for the sum of two amounts, requested amount and surcharge.

"Interchange" is assessed on this total transaction amount and is typically paid by the service provider of the quasi-cash transaction. The service provider subsequently charges the casino a fee, commonly referred to as a "buyrate" in the casino industry, to cover the service provider's costs of the interchange, other expenses, and profit. A typical buyrate fee charged to a casino for a quasi-cash transaction ranges from 2.5%-3.5% of the transaction amount authorized.

Service fees on credit card quasi cash transactions without a PIN typically have a tiered rate structure such that the lower dollar amount requested carries a higher service fee and a larger requested dollar amount carries lower fees.
Examples of typical service fees for credit card:
$100=$9.99 fee=10%
$500=$39.99 fee=8%
$1000=$69.99 fee=7%
$5000=$174.99 fee=3.5%

As it relates to debit card with a PIN the fee is generally a flat fee per transaction plus percentage, say $2.95 plus 3.5% of the amount requested.
Examples of typical service fees for debit card:
$100=$6.45 fee=6.45%
$500=$20.45 fee=4%
$1000=$27.95 fee=3.8%
$5000=$177.95 fee=3.5%

The "buyrate" is the fee charged by the service provider of the transaction to the casino. The buyrate range is 2.5%-3.5%. The buyrate typically gets calculated as follows, using an example from above for a credit card.
Example of buyrate calculation when fee is charged:
Amount=$500
Fee=$39.99
Total amount+fee=$539.99

Buyrate is calculated by taking the $539.99 and multiplying by 3.5% to reach $18.99, the buyrate to be paid to the service provider. The casino makes, as a "commission," the difference between the service fee the casino charged (e.g. of $39.99) minus the buyrate (e.g. of $18.99), which is $21.00 for the casino commission The service provider pays the interchange out of their buyrate, which interchange is 2.30%. So out of the $18.99 buyrate the service provider will pay $12.40 as interchange to the Association. (Again, interchange is based on total amount+fee.) This generates a net profit to the service provider of $6.59: ($18.99 buyrate minus $12.40 interchange).
If a service fee were not charged the patron by the casino, the following economics occur. Buyrate calculation when a fee not charged (quasi-cash transaction)
Amount=$500
Service Fee=$0.00
Total amount+fee=$500.00

Buyrate is $500.00 multiplied by 3.5%, or $17.50, to be paid to the service provider by the casino.
Since there is no service fee charged the patron, the casino receives no commission and has to pay $17.50 to the service provider.

The service provider again pays the interchange out of the buyrate which interchange is 2.30%. So out of the $17.50 to the service provider they will pay $11.50 as interchange deduction, generating a net profit to the service provider of $6.00 ($17.50 buyrate minus $11.50 interchange).

The high buyrate charged by the service provider to the casino is one of several factors mitigating against a broad adoption of a "no fee" strategy by casinos for patron bankcard use to secure a cash advance.

For a dramatically different economic model, financial institutions that are "Principal Members" of Visa or MasterCard or like Associations and their authorized agents can be authorized to provide cash advance services to their patrons. These institutions, which have obtained the requisite banking regulator approval, can make available to the general public a service, for Visa or MasterCard or the like cardholders, (bankcard holders) to obtain cash as Manual Cash Disbursement ("MCD.") The cash can be obtained directly through the Principal Member or other financial institution agents designated by the Principal Member.

Among other requirements imposed by Visa and MasterCard and the like MCD transactions prohibit additional surcharge or convenience fees, and mandate that only cash must be provided to the cardholder; cash equivalents are not accepted.

The economics associated with MCD transactions are materially different than those of quasi-cash transactions. Most notable among these distinctions is that, as a Principal Member of Visa and MasterCard and the like or as an authorized financial institution agent of such, these financial institutions do not pay "interchange" fees when providing MCD services. Rather they receive "interchange."

Here is the compelling math of MCD:
Example of MCD when fee is not charged. Assume the service provider is an authorized financial institution agent of a Principal Member
Amount=$500
Fee=$0.00
Total amount+fee=$500.00

Assume no buyrate is calculated or charged because interchange will be paid to the service provider and there is no buyrate charged to the casino. The service provider authorized financial institution agent gets paid interchange from the card issuing bank of $2.00.

Thus, a "No Fee" quasi cash transactions costs the casino $17.50. A "No Fee" MCD transactions costs the casino $0.00. Event if the casino made the service provider whole, to some extent, there is significant savings.

Were the casino service provider an MCD authorized financial institution agent of a Principal Member of the Card Association, this economic shift in the imposition of interchange fees could facilitate casino operators adopting a broad "no fee" strategy for card cash advance transactions, and incentivize service providers to adopt a significant or low "buyrate." This approach not only offers cost savings to both the casino operator and the patron, but presents a meaningful new opportunity for the casino to grow its revenue.

In order for this dramatic shift in cash disbursement methodology to occur, a casino location must meet a financial institution status by a state or federal banking regulator so as to qualify for offering MCD transactions as an authorized agent of a Principal Member of Visa or MasterCard or the like. An important aspect of the instant invention is disconcerting and determining that this is possible.

The present invention proposes to offer a casino location an ability to process both quasi-cash and MCD transactions. An important fact which makes the present invention startling, is recognizing that these two distinct transaction types, quasi cash and MCD, have been supported by Visa and MasterCard and the like for more than 20 years, yet no one has offered the two in conjunction with one another.

To summarize, this environment of quasi-cash and MCD coexistence provides following direct benefits:

1. Provides a direct economic benefit for both the casino and patron by providing for processing transactions where patron service fees are not charged, or are waived, where interchange charges are "reversed," and where a buyrate charged by the service provider to the casino can be significantly reduced.

2. Provides an incentive to the casino to offer bankcard transactions without a patron fee, which would materially increase the number of cash advance transactions in a given location, as well as economic flexibility to offer bankcard transactions for no fee on a periodic or promotional basis to increase business levels either from all patrons or to a targeted segment of patrons or transaction amounts without modifying the underlying technology. Due to the high fees generally charged on bankcard transactions, the elasticity of demand for quasi-cash transactions is very steep and strongly discourages use. High fees generally charged on bankcard transactions strongly discourages use and the demand for quasi-cash transactions is highly elastic in favor of transactions where no fees are applied 3. Provides economic benefit for card issuers by significantly increasing bank card transactions in a casino environment.

Preferably the invention creates cost efficiencies due to an ability to provide seamless integrating of computing software and workstation device peripherals for both traditional quasi-cash and MCD transactions.

As is frequently the case, the instant invention developed as a clever improvement for a casino environment but appears to have application to certain other merchant environments, referred to as similar merchants. Thus "casinos" herein should be understood to include non-bank merchants who could receive cash advance requests associated with presented bankcards and to whom the invention could provide advantages. The instant invention could support any similar merchant, or "casino," that is considered a financial institution or an agent of Member.

In the following "bankcard" refers to an open system card association card, a card processed over a card network, such as a credit card, debit card, open system stored value card or the like. These cards are issued by a bank or other financial institution that is a member of the Card Association or by an affiliate or authorized agent thereof, and are typically branded with Visa or MasterCard or another like Association.

"Authorized MCD processor" refers to an authorized MCD processor and/or its authorized agent.

A "cardholder" is one to whom a "bankcard" has been issued.

An issuer or issuing bank is a member of the Card Association, or is an agent or affiliate of a Member, who enters into a contractual relationship with a cardholder for the issuance of one or more bankcards.

"Cash disbursement" refers to currency, including traveler's checks, that is paid out to a cardholder using a card. An ATM cash disbursement is the most typical.

A "manual cash disbursement" or "MCD" is a cash disbursement obtained with a bankcard in a face-to-face environment. A face-to-face environment implies that a card is presented. A cardholder and an individual representing the merchant are required to be present to complete the transaction.

Card Associations, such as Visa or MasterCard or the like, have a variety of types of members. One type of member is a Principal Member. Principal Members can be authorized to perform MCD, as well as their authorized agents.

A quasi-cash transaction is a transaction representing a merchant's, or a member's, sale of items directly convertible to cash, such as gaming chips, money orders, deposits, wire transfer, traveler's checks, Visa travel money cards, foreign currency, and the like.

A "processor" is a Card Association member or approved non-member, who is directly connected to a Network and provides settlement services for merchants and members.

An "indicated transaction" refers to a cash advance request which is indicated as appropriate for MCD processing, in particular to and/or by processing software. Various algorithms could be adopted. All requests might be indicated, or only certain qualifying or tagged requests.

The invention relates to an improved method for processing bankcard "cash advance" transactions at a casino, which method includes utilizing a principal member of a Card Association, or more likely an authorized agent of a Principal Member, for optionally processing non-service-fee/non-surcharge transactions as Manual Cash Disbursements.

A system and method is disclosed which facilitates bankcard cash advance transactions at casinos for customers. In a preferred embodiment the system and method includes receiving a transaction request related to a bankcard by a processing service provider, the processor having recourse to indicia of the applicability of a surcharge. When a cash advance transaction is to be processed without charging a customer a surcharge or service fee, the MCD authorized principal member, more likely or its authorized agent may process the transaction as a "Manual Cash Disbursement" transaction. When a transaction is to be processed inclusive of a customer surcharge or service fee, the service provider will process the transaction as a "quasi-cash" transaction.

Preferably, a processing device and/or a processing service provider, intermediate or ultimate, interprets a transaction record and/or other available data and determines the appropriate processing method, most preferably based upon the presence or absence of an indicia of a service-fee/surcharge. Cash disbursement information is preferably electronically generated by a processing system provider and sent to either an intermediary processor, who forwards the relevant information to an appropriate processing Network or Card Association Network, or is sent directly to an appropriate processing Network or Card Association Network. The system interpretation of the existence of a service-fee/surcharge or not can occur at various locations and stages, such as at an automated terminal, or at an automated centralized system at a merchant location, or at a location that supports multiple merchant locations, or at an intermediary processor.

The present invention relates to improved systems and methods for performing cash advance transactions at a merchant for a customer. More particularly, it relates to systems and methods for use in particular in a casino to dynamically process cash advance transactions using either Manual Cash Disbursement processing methods and systems or Quasi-Cash processing methods and systems. The choice is typically based on whether a service-fee or surcharge has been, or is to be, included in the transaction authorization request.

"Merchant" and "casino" are used herein to indicate commercial entities that provide or might advantageously provide cash advance transactions for customers as an adjunct to providing significant non-banking goods and/or services. In the following discussion a merchant may be paradigmatically referred to as a casino, which is an exemplary merchant for the instant invention. The invention, however, is potentially applicable to a variety of merchants. "Casino," thus, should be understood to cover similar merchants.

SUMMARY OF THE INVENTION

A system and method for identifying and/or instigating bankcard transactions of a unique type for a casino environment for a cardholder based on criteria of, or indicia of, a cashier agent's transaction type selection and/or the existence of a surcharge or convenience fee imposed on the cardholder.

In the instant invention, when a bankcard transaction is processed and authorized without charging the cardholder a surcharge or convenience fee, the transaction particularly uses a different processing code than it would for a bankcard transaction processed and authorized with a surcharge or convenience fee for the same cardholder. The present invention includes a systematic determination, based on a set of variable rules or events, of when a surcharge or convenience fee is to be charged or not charged, and how to assign an appropriate processing code for each event or subsequent event. The specific processing code for each event or subsequent event can be an internally generated processing code or a processing code consistent with Visa and MasterCard rules for bankcard use in casinos. The system determination can occur at a device located in a casino environment, at a centralized system located in a casino environment, at a centralized system at an off-site casino location that supports multiple locations, or at a centralized system at an intermediary processor or service provider location that communicates to the casino location. The present invention allows for manual human intervention to determine the transaction type selection or when a surcharge or convenience fee is to be assessed to the cardholder. A surcharge or convenience fee includes, but is not limited to, any additional authorized amount that exceeds the value of the cash received by the cardholder (or any item of value) that is directly or indirectly associated with the transaction's authorization or with a separate transaction's authorization that might be related to the original transaction.

The invention includes an improved method for processing cash advance transactions in a computerized system, in particular for a casino. The method includes establishing at least a minimally necessary presence of an acquiring bank in and at a merchant. The merchant might be a casino. The method includes receiving information into the system in regard to a requested cash advance transaction for a customer at the merchant. The method includes determining whether a customer service fee/surcharge applies. The method includes processing non-service fee/surcharge transactions as Manual Cash Disbursements. The method may include receiving Manual Cash Disbursement interchange by the acquiring bank. Preferably the method includes processing transactions, when a customer service fee/surcharge applies, as a quasi-cash transaction.

The instant inventive method includes a computerized method for processing cash advance transactions at a merchant that includes establishing a presence of an acquiring bank at and in the merchant. The method includes processing at least 30% of the banks transactions for merchant customers as Manual Cash Disbursement transactions, processed in a computerized system. In preferred embodiments the merchant is a casino and the bank presence is established proximate a gaming floor.

BRIEF DESCRIPTION OF THE DRAWINGS

A better understanding of the present invention can be obtained when the following detailed description of the preferred embodiments are considered in conjunction with the following drawings, in which:

FIG. 2 illustrates the relationships of the parties, the merchant/casino, the processing service provider and the acquiring bank, and how they integrate with the card association issuers and their processing networks.

Figure 1:
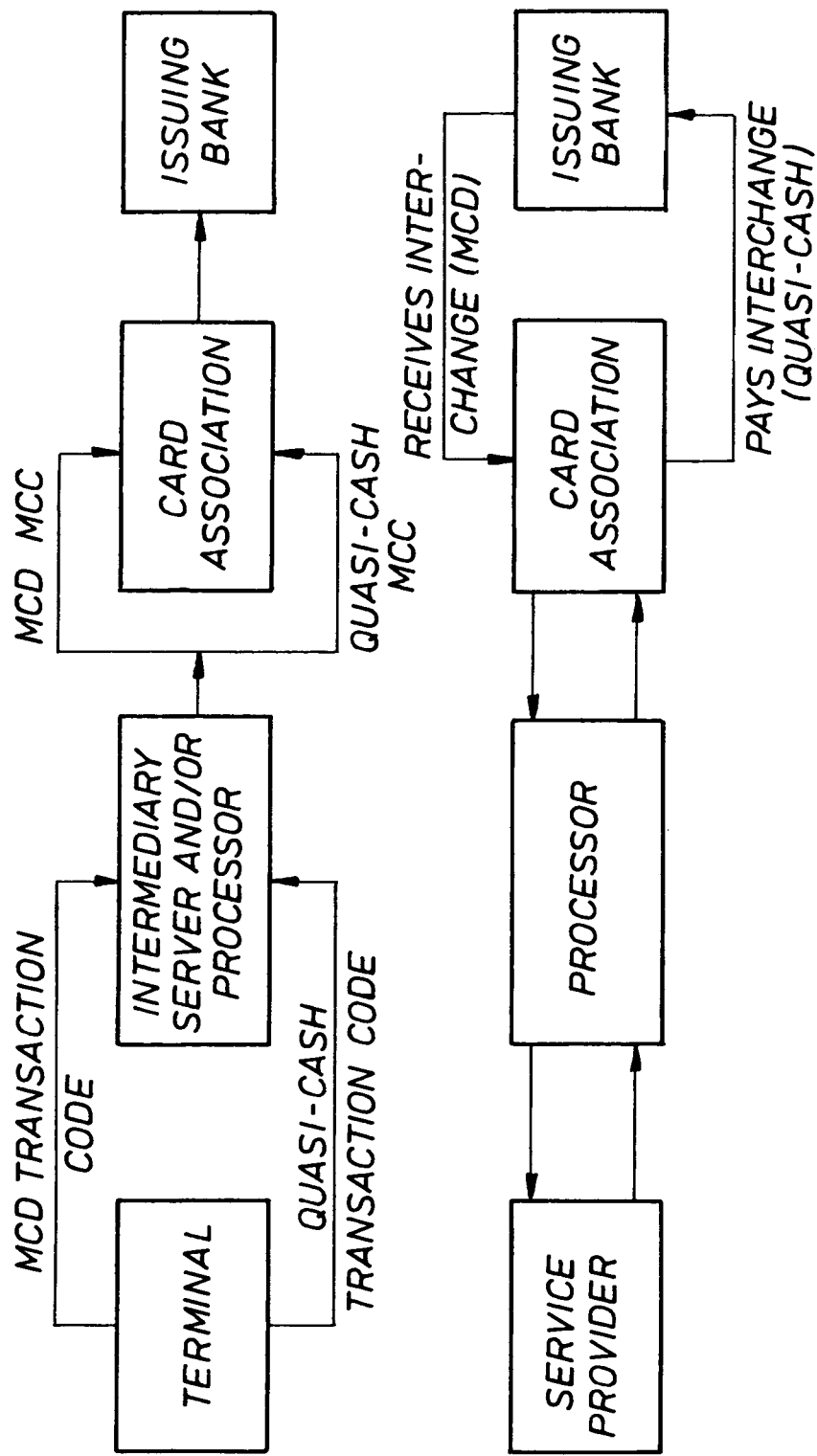
FIG. 1 illustrates the ease of integration of MCD transactions with quasi-cash transactions by a processing services provider at and for a merchant.

The drawings are primarily illustrative. It would be understood that structure may have been simplified and details omitted in order to convey certain aspects of the invention. Scale may be sacrificed to clarity.

DESCRIPTION OF THE PREFERRED EMBODIMENTS

In one sense the instant invention involves pulling together two discoveries: (1) that a casino increases income if it waives the service fee/surcharge for cash advance transactions; and (2) that little known, little appreciated Manual Cash Disbursement transactions are possible at a casino with a presence of a member bank, which results in the processing system receiving a small "interchange" rather than paying the traditional "interchange," and thus significantly lowering the casino's cost for performing the service.

Putting together the above discoveries, the instant inventor discloses the following invention. At a casino, when it is desired to waive a customer service fee/surcharge for a cash advance transaction, given a member bank presence in the casino, the transaction can be processed as a Manual Cash Disbursement, avoiding the payment of traditional "interchange" by the processing system and resulting in the receipt of a small interchange.

A member bank presence, as referred to herein, could be as a main bank, or as a branch bank, or as a limited branch bank, or as bank agents or as other arrangements meeting the requirements for a MCD transaction. The instant invention assumes a member bank with such a presence established at and in a casino.

The lower portion of FIG. 1 indicates the pathways for interchange depending on whether the transaction is quasi-cash or MCD. In the quasi-cash transaction, the lower path LP of the lower portion of FIG. 1 shows that an interchange fee proceeds from the service provider usually through some processor to the card association and to (at least in part) the issuing bank. In the case of the MCD transaction, upper path UP, the issuing bank institutes a small interchange back to the card association that goes back to the processor and back to the service provider and/or member bank.

In regard to the top portion of FIG. 1, the seamless nature of the transaction is indicated. The transaction initiates at a terminal T and there will be some indication that an intermediary server and/or processor and/or service provider can use to determine whether it is to be forwarded as an MCD transaction or a quasi-cash transaction. Both transactions are forwarded, as either an MCD or a quasi-cash transaction, to the card association and to the issuing bank. The issuing bank will debit the customer's account for the full amount of their transaction. At or proximate the terminal the customer will receive a cash or cash equivalent amount equal to the full transaction amount. The intermediary server and/or processor or service provider handles crediting a merchant account at a merchant bank. The source of the credit is the issuing bank and utilizes an account maintained by the intermediary server and/processor or service provider with the issuing bank or network.

FIG. 2 illustrates the relationship between the parties of the instant invention, namely a merchant/casino; a processing service provider; and a member bank. A three-way contractual relationship likely exists between the processing service provider, the member bank and the merchant/casino. The merchant/casino and member bank will establish a member bank presence at and in the merchant/casino, preferably at and in a gaming floor of a casino. Proximate the member bank presence will be a location for the arrival of customers/patrons who wish to undertake a cash transaction. The location will include a source of cash or the like with which to grant the customer/patron's request and a terminal. Electronic information in regard to the requested transaction will move between the terminal and the processing service provider. The processing service provider communicates with the card networks, the card associations and the issuing bank, directly or indirectly. The processing service provider processes transactions as either a quasi-cash transactions or a Manual Cash Disbursement, as a function of information received from the terminal. The processing service provider pays and/or receives interchange, as the case may be, and debits and/or credits and accounts as per contractual arrangements. The processing service provider receives credit to its account in regard to the authorized transaction.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A method of processing cash advance transactions in a casino as a Manual Cash Disbursement (MCD) transaction by an authorized MCD processor in the casino, the method comprising:

receiving information relating to a cash advance request and a bankcard in a casino by the authorized MCD processor, wherein said authorized MCD processor includes a financial institution that is a Principal Member of a bankcard association or an authorized agent of a Principal Member;

dispersing cash or authorizing dispersing cash to a requestor;

instituting an authorization to debit an account of the bankcard over a bankcard Association Network; and receiving an interchange fee by the Principal Member because of the MCD transaction from a card issuing bank.

2. The method of claim 1 including charging the requestor no fee for the MCD transaction.

3. The method of claim 2 including paying no interchange by the MCD processor for the MCD transaction.

4. The method of claim 1 including paying no interchange by the MCD processor for the MCD transaction.

5. The method of claim 1, 2, 4 or 3 including receiving the information relating to the bankcard and request on a device in the casino, the device in communication with related application processing software, and indicating by or to the device some requests to be for MCD transactions and some requests to be for quasi-cash transactions.

6. The method of claim 5 including associating, by the software, MCD transactions and quasi-cash transactions with different merchant processing codes.

7. The method of claim 5 that includes determining, by the software, whether a request is to be processed as a MCD transaction.

8. The method of claim 5 including utilizing one software application that combines an ability to perform MCD transactions and quasi-cash transactions with one device.

9. The method of claim 5 including indicating a transaction type as MCD or quasi-cash at least by one of a cardholder or a casino teller to the device.

10. The method of claim 5 including using a different TIN (Transaction Identification Number) or BIN (Bank Identification Number) as an indicator of a transaction type, MCD or quasi-cash.

* * * * *